Aug. 21, 1962   A. R. BIEDESS   3,050,158
BRAKE FOR ROCK LOADING MACHINE
Filed Dec. 29, 1959   2 Sheets-Sheet 1

INVENTOR.
Anthony R. Biebess
BY

Aug. 21, 1962    A. R. BIEDESS    3,050,158
BRAKE FOR ROCK LOADING MACHINE
Filed Dec. 29, 1959    2 Sheets-Sheet 2

INVENTOR.
Anthony R. Biedess
BY

3,050,158
BRAKE FOR ROCK LOADING MACHINE
Anthony R. Biedess, Chicago, Ill., assignor to Goodman Manufacturing Company, Chicago, Ill., a corporation of Illinois
Filed Dec. 29, 1959, Ser. No. 862,646
4 Claims. (Cl. 188—152)

This invention relates to improvements in brakes and more particularly relates to an improved form of brake operating mechanism adapted for rock loading machines and the like.

A principal object of the invention is to provide an improved form of brake particularly adapted for rock loading machines and the like, having a novel form of operating mechanism for applying the brake either hydraulically or mechanically.

Another object of the invention is to provide an improved form of hydraulic brake for rock loading machines and the like, in which the brake is applied by a hydraulic cylinder and piston, supported on manually operable brake applying means, operable to set the brake manually for parking purposes, upon the release of fluid under pressure from the hydraulic cylinder and piston.

Still another object of the invention is to provide a combined manual and hydraulic brake operating mechanism in which the manual brake operating mechanism serves to adjust the brake as well as apply the brake manually for parking purposes.

These and other objects of the invention will appear from time to time as the following specification proceeds and with reference to the accompanying drawings wherein.

Figure 1:
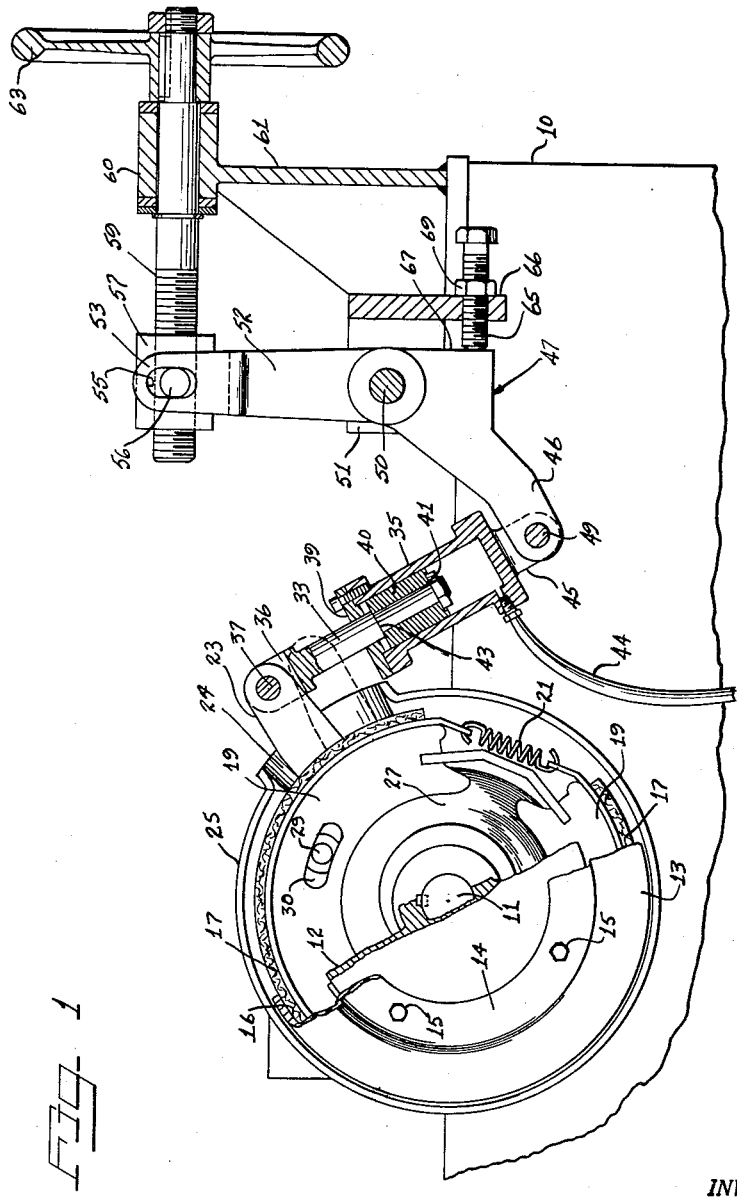
FIGURE 1 is a partial fragmentary view in side elevation of a portion of the frame work of a rock loading machine, showing parts of the brake for the machine and parts of the manual and hydraulically operated mechanism for applying the brake in section.
Figure 2:
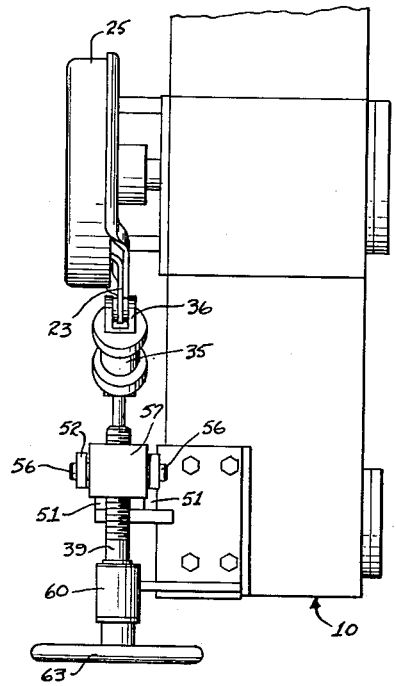
FIGURE 2 is a plan view of the brake operating mechanism shown in FIGURE 1, drawn to a reduced scale.
Figure 3:
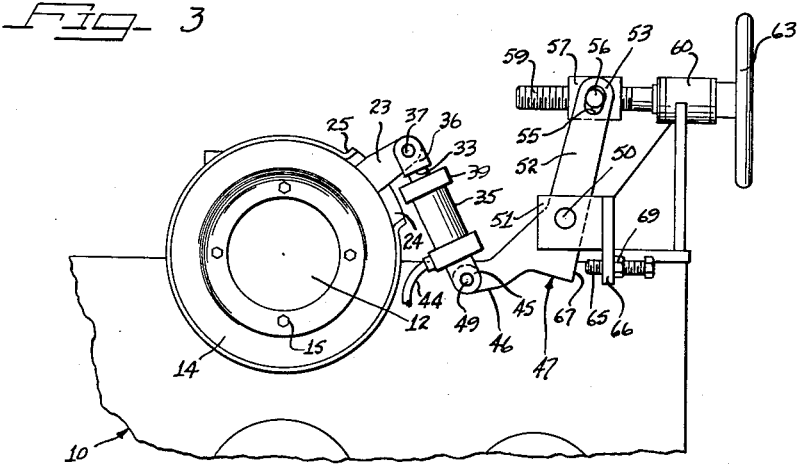
FIGURE 3 is a view in side elevation of the brake operating mechanism, showing the brake applied by the manual brake operating mechanism.

In the embodiment of the invention illustration in the drawings, a portion of a frame 10 of a rock loading machine of a type operable in mines underground, is shown for illustrative purposes. The rock loading machine may be of a type like that shown in a companion application Serial No. 10,775, filed by me on February 24, 1960 and entitled "Rock Loading Machine," and a continuation in part of application Serial No. 737,048, filed May 22, 1958, now abandoned, and is no part of the present invention, so need not herein be shown or described.

As shown in FIGURE 1, a shaft 11, which may be a transmission shaft, or which may have geared drive connection with the drive gearing for driving the rock loading machine, is shown as having a disk 12 keyed or otherwise secured to the outer end thereof, and as having an annular flange 13 extending radially outwardly therefrom and secured thereto as by cap or machine screws 15. The drum 13 has an internal generally cylindrical surface 16 adapted to be engaged by friction braking members 17 in the form of friction shoes or bands mounted on the outer surfaces of expansible and contractible shoes 19, held in a contracted condition by a tension spring 21. The shoes 19 are expanded to frictionally engage the friction shoes 17 with the internal cylindrical surface 16 of the brake drum 13 by operation of a lever 23. The lever 23 is movable within a slotted portion 24 of a stationary casing 25 extending about the drum 13, to enclose said drum except for the flanged portion 14 thereof.

The lever 23 extends outwardly from a disk 27 eccentrically mounted on the shaft 11 and having pin 29 projecting axially therefrom and extending through arcuate slot 30, formed concentric with the center of the shaft 11, to expand and contract the brake shoes 19 upon operation of said lever, in a manner similar to that shown and described in Patent No. 2,852,105 which issued to B. E. House et al. on September 16, 1958, so not herein shown or described further.

Referring now in particular to the operating means for the lever 23 for applying and releasing the friction shoes 17 to and from the internal cylindrical surface 16 of the drum 13, a piston rod 33 extensible from a hydraulic cylinder 35, is shown as having a bifurcated end portion 36 extending along opposite sides of the lever 23, and pivotally connected thereto as by a pivot pin 37. The piston rod 33 slidably extends through an end cap 39 for the piston rod end of the cylinder 35, and has a piston 40 secured to its inner end as by a nut 41 threaded on the inner end of said piston rod, and retaining said piston in engagement with a shouldered portion 43 of said piston rod.

A pressure line 44, connected with a suitable source of hydraulic fluid under pressure under the control of the usual valve means (not shown) operated by a brake pedal (not shown) or the like, is connected with the head end of the cylinder 35 to supply fluid under pressure thereto, to extend the piston rod 33 from the cylinder 35 and apply the friction shoes 17 to the internal cylindrical surface 16 of the drum 13, to hydraulically brake the rock loading machine. Upon the release of fluid under pressure from the pressure line 44, the spring 21 will retractably move the shoes 19 and move the lever 23 from the solid line position shown in FIGURE 1 to the dotted line position shown in this figure, to release the brake.

Referring now in particular to the manually operable means for setting the brake and forming a support for the cylinder 35 and an adjusting means for the brake, the cylinder 35 has an ear 45, projecting from its head end and pivotally supported on a depending arm 46 of a bellcrank 47 on a pivot pin 49.

The bellcrank 47 is pivotally mounted intermediate its ends on a pivot pin 50, mounted at its ends in spaced bracket members 51, suitably secured to the frame 10. The bellcrank 47 has an upright arm 52 having an upwardly opening bifurcated upper end portion 53 having slots 55 extending vertically therealong, within which fit trunnion pins 56, extending from a nut 57, threaded on a threaded brake operating shaft 59.

The brake operating shaft 59 is rotatably mounted in a boss 60 on the upper end of a bracket member 61 and is retained from axial movement with respect thereto. A hand wheel 63 is keyed or otherwise secured to the outer end of the threaded shaft 59 for rotating said shaft, to effect rocking movement of the bellcrank 47 and movement of the cylinder 35 and piston rod 33 in a direction to apply the brake, when hydraulic fluid under pressure has been released from said cylinder. The pitch of the threads of the threaded shaft 59 may be such as to lock said threaded shaft from rotation when the hand wheel 63 is stationary and to thereby hold the brake applied for parking purposes.

A stop screw 65 is threaded within an ear 66 extending between the bracket members 51 and depending therefrom. The stop screw 65 is adapted to abut a rear face 67 of the bellcrank 47 and limit retractable movement of said bellcrank and of the cylinder 35 and piston rod 33. The stop screw 65 is shown as being locked in position by a lock nut 69, threaded thereon and adapted to abut the outer face of the ear 66. The stop screw 65 limiting retractable movement of the bellcrank 47 thus determines the position of the bellcrank 47, the nut 57 and the cylinder 35 when the brake is released. Adjustment of the stop 65 will thus adjust the position of the cylinder 35, lever 53 and nut 57 with respect to housing 25 and shoes 19 and thereby accommodates the position of the cylinder 35 to be changed and be supported closer to the housing 25 and brake shoes 17 as the brake shoes wear, to take up for wear on said brake shoes 17.

It may be seen from the foregoing that the brake may be applied hydraulically by the admission of fluid under pressure to the head end of the cylinder 53 to extensibly move the piston rod 33 and thereby move the lever 23 to the solid line position shown in FIGURE 1. When, however, it is desired to apply the brake mechanically, as when it is desired to park the rock loading machine, and hydraulic fluid under pressure has been released from the cylinder 35, it is merely necessary to turn the hand wheel 63 and move the bell crank in a clockwise direction, and thereby move the cylinder 35 along the piston 40 until the lower end portion of the piston rod 33 bottoms on the lower head of the cylinder 35. The cylinder 35 and piston 33 will then move as a unit in a direction to apply the brake.

While I have herein shown and described one form in which my invention may be embodied, it should be understood that various modifications and variations in the invention may be attained without departing from the spirit and scope of the novel concepts thereof as defined by the claims appended hereto.

I claim as my invention:

1. In a braking mechanism particularly adapted for rock loaders and the like,
   (a) a drum,
   (b) a friction braking member engageable with said drum to hold said drum from rotation,
   (c) a hydraulic cylinder having
   (d) a piston therein and
   (e) a piston rod extensible therefrom upon the admission of fluid under pressure to said cylinder,
   (f) an operative connection between said piston rod and said friction braking member for engaging said friction braking member with said drum upon the admission of hydraulic fluid under pressure to said cylinder,
   (g) a lever forming a movable support for said hydraulic cylinder,
   (h) means for limiting movement of said lever in one direction and adjustable to adjust the position of said hydraulic cylinder and piston rod with respect to said drum, to adjust the braking mechanism for wear.
   (i) and other means manually operable to move said lever and hydraulic cylinder bodily to first retract said piston rod with respect to said cylinder and to then bodily move said piston rod and cylinder together to manually apply said friction braking member to said drum.

2. In a braking mechanism,
   (a) a shaft,
   (b) a drum secured to said shaft,
   (c) a friction braking member engageable with said drum to retain said shaft from rotation,
   (d) a lever arm operatively connected with said friction braking member for engaging said friction braking member with said drum,
   (e) spring means for disengaging said friction braking member from said drum and retractibly moving said lever arm,
   (f) a bellcrank,
   (g) a link connecting said bellcrank with said lever arm,
   (h) manually operable means for pivotally moving said bellcrank in a direction to move said link to effect the engagement of said friction braking member with said drum and to hold said friction braking member in engagement with said drum,
   (i) said link comprising a hydraulic cylinder and piston unit having
   (j) a piston rod extensible therefrom, effective to move said lever arm to apply said brake upon the admission of fluid under pressure to said cylinder and effective to apply said brake manually upon retractible movement of said piston rod with respect to said cylinder and piston unit upon operation of said manual operable means in a direction to move said bellcrank in a brake applying direction.

3. A braking mechanism in accordance with claim 2, in which an adjustable stop is provided to limit movement of said bellcrank in a direction to release said brake and to vary the position of said link and lever arm with respect to said friction braking member when said piston rod is in a retracted position with respect to said cylinder and piston unit and said brake is in a released position, to thereby take up for wear on said friction braking member.

4. A braking mechanism in accordance with claim 3, wherein a hand wheel, a threaded shaft operated thereby, and a nut carried by said bellcrank and threaded on said shaft is provided to retractibly move said cylinder and piston unit with respect to said piston rod upon the release of hydraulic fluid under pressure from said cylinder and piston unit and to then bodily move said hydraulic cylinder and piston unit and piston rod to apply the brake manually and to hold the brake in an applied condition.

References Cited in the file of this patent

UNITED STATES PATENTS

| | | |
|---|---|---|
| 1,847,881 | Lauder | Mar. 1, 1932 |
| 2,792,083 | Bourque et al. | May 14, 1957 |
| 2,797,590 | Reeves | July 2, 1957 |
| 2,852,105 | House et al. | Sept. 16, 1958 |
| 2,907,415 | Norman | Oct. 6, 1959 |

FOREIGN PATENTS

| | | |
|---|---|---|
| 1,029,692 | Germany | May 8, 1958 |